US011675719B2

(12) United States Patent
Hadav et al.

(10) Patent No.: US 11,675,719 B2
(45) Date of Patent: Jun. 13, 2023

(54) SYSTEM AND METHOD FOR MULTI-NODE COMMUNICATION

(71) Applicant: EMC IP Holding Company, LLC, Hopkinton, MA (US)

(72) Inventors: Aric Hadav, Tel-Aviv (IL); Xiang Yu, Shanghai (CN); Sandburg Hu, Shanghai (CN); Kunzheng Zhang, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/240,240

(22) Filed: Apr. 26, 2021

(65) Prior Publication Data

US 2022/0342836 A1 Oct. 27, 2022

(51) Int. Cl.
*G06F 13/28* (2006.01)
(52) U.S. Cl.
CPC .......... *G06F 13/28* (2013.01); *G06F 2213/28* (2013.01)

(58) Field of Classification Search
CPC .............................. G06F 13/28; G06F 2213/28
See application file for complete search history.

(56) References Cited

U.S. PATENT DOCUMENTS

| 2007/0011272 | A1* | 1/2007 | Bakke | G06F 9/5027 |
| | | | | 709/217 |
| 2017/0039150 | A1* | 2/2017 | Dreier | G06F 13/28 |
| 2018/0074909 | A1* | 3/2018 | Bishop | G06F 11/2097 |
| 2020/0026656 | A1* | 1/2020 | Liao | H04L 67/1097 |
| 2020/0084138 | A1* | 3/2020 | Wang | H04L 45/22 |
| 2020/0389399 | A1* | 12/2020 | Wang | H04L 45/66 |

* cited by examiner

*Primary Examiner* — Idriss N Alrobaye
*Assistant Examiner* — Ronald T Modo
(74) *Attorney, Agent, or Firm* — Brian J. Colandreo; Heath M. Sargeant; Holland & Knight LLP

(57) ABSTRACT

A method, computer program product, and computing system for coupling a multi-host remote direct memory access (RDMA) card to at least a pair of central processing units (CPUs). One or more signals may be routed, via the multi-host RDMA card, between the at least a pair of CPUs.

20 Claims, 10 Drawing Sheets

SYSTEM AND METHOD FOR MULTI-NODE COMMUNICATION

BACKGROUND

Storing and safeguarding electronic content may be beneficial in modern business and elsewhere. Accordingly, various methodologies may be employed to protect and distribute such electronic content.

Conventional approaches to providing communications between storage processors of a storage system generally include coupling each central processing unit (CPU) using a midplane positioned on the external device/IO side of an information technology (IT) component utilizing peripheral component interconnect express (PCIe) non-transparent bridge (NTB) to effectuate signaling between the CPUs. However, without NTB compliance between CPU vendors and/or CPU generations, different CPUs (e.g., from the same vendor and/or different vendors) may not communicate effectively using NTB. Further, conventional approaches are unable to provide support for virtualized systems and virtual machines (e.g., using VMware® ESXi or similar). In addition, conventional approaches require high software overhead to create high bandwidth and reliable messaging above NTB. For example, to replicate RDMA paths over PCIe, software stacks may be required to mimic an Ethernet port across PCIe.

Other conventional approaches include the use of an IO card on each storage processor and an external physical cable connection run between the IO cards. In addition to requiring two IO cards and a physical cable to be run between the IO cards, at least two IO slots may be blocked from the rear side of an IT component.

SUMMARY OF DISCLOSURE

In one example implementation, a computer-implemented method executed on a computing device may include, but is not limited to, coupling a multi-host remote direct memory access (RDMA) card to at least a pair of central processing units (CPUs). One or more signals may be routed, via the multi-host RDMA card, between the at least a pair of CPUs.

One or more of the following example features may be included. Coupling the multi-host RDMA card to the at least a pair of CPUs may include coupling each CPU of the at least a pair of CPUs to a midplane and coupling the multi-host RDMA card to the midplane. The midplane may be configured to be positioned on a storage drive-side of an information technology (IT) rack. A first CPU of the at least a pair of CPUs may be positioned within a first storage processor and a second CPU of the at least a pair of CPUs may be positioned within a second storage processor. A second multi-host RDMA card may be coupled to a third CPU positioned within the first storage processor and a fourth CPU positioned within the second storage processor. One or more signals may be routed, via the second multi-host RDMA card, between the third CPU and the fourth CPU. The multi-host RDMA card may be configured to provide Ethernet over PCIe connectivity between the at least a pair of CPUs. Routing the one or more signals between the at least a pair of CPUs may include mirroring data between the at least a pair of CPUs.

In another example implementation, a computer program product resides on a computer readable medium that has a plurality of instructions stored on it. When executed by a processor, the instructions cause the processor to perform operations that may include, but are not limited to, coupling a multi-host remote direct memory access (RDMA) card to at least a pair of central processing units (CPUs). One or more signals may be routed, via the multi-host RDMA card, between the at least a pair of CPUs.

One or more of the following example features may be included. Coupling the multi-host RDMA card to the at least a pair of CPUs may include coupling each CPU of the at least a pair of CPUs to a midplane and coupling the multi-host RDMA card to the midplane. The midplane may be configured to be positioned on a storage drive-side of an information technology (IT) rack. A first CPU of the at least a pair of CPUs may be positioned within a first storage processor and a second CPU of the at least a pair of CPUs may be positioned within a second storage processor. A second multi-host RDMA card may be coupled to a third CPU positioned within the first storage processor and a fourth CPU positioned within the second storage processor. One or more signals may be routed, via the second multi-host RDMA card, between the third CPU and the fourth CPU. The multi-host RDMA card may be configured to provide Ethernet over PCIe connectivity between the at least a pair of CPUs. Routing the one or more signals between the at least a pair of CPUs may include mirroring data between the at least a pair of CPUs.

In another example implementation, a computing system includes at least one processor and at least one memory architecture coupled with the at least one processor, wherein the at least one processor is configured to couple a multi-host remote direct memory access (RDMA) card to at least a pair of central processing units (CPUs). The at least one processor may be further configured to route, via the multi-host RDMA card, one or more signals between the at least a pair of CPUs.

One or more of the following example features may be included. Coupling the multi-host RDMA card to the at least a pair of CPUs may include coupling each CPU of the at least a pair of CPUs to a midplane and coupling the multi-host RDMA card to the midplane. The midplane may be configured to be positioned on a storage drive-side of an information technology (IT) rack. A first CPU of the at least a pair of CPUs may be positioned within a first storage processor and a second CPU of the at least a pair of CPUs may be positioned within a second storage processor. A second multi-host RDMA card may be coupled to a third CPU positioned within the first storage processor and a fourth CPU positioned within the second storage processor. One or more signals may be routed, via the second multi-host RDMA card, between the third CPU and the fourth CPU. The multi-host RDMA card may be configured to provide Ethernet over PCIe connectivity between the at least a pair of CPUs. Routing the one or more signals between the at least a pair of CPUs may include mirroring data between the at least a pair of CPUs.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
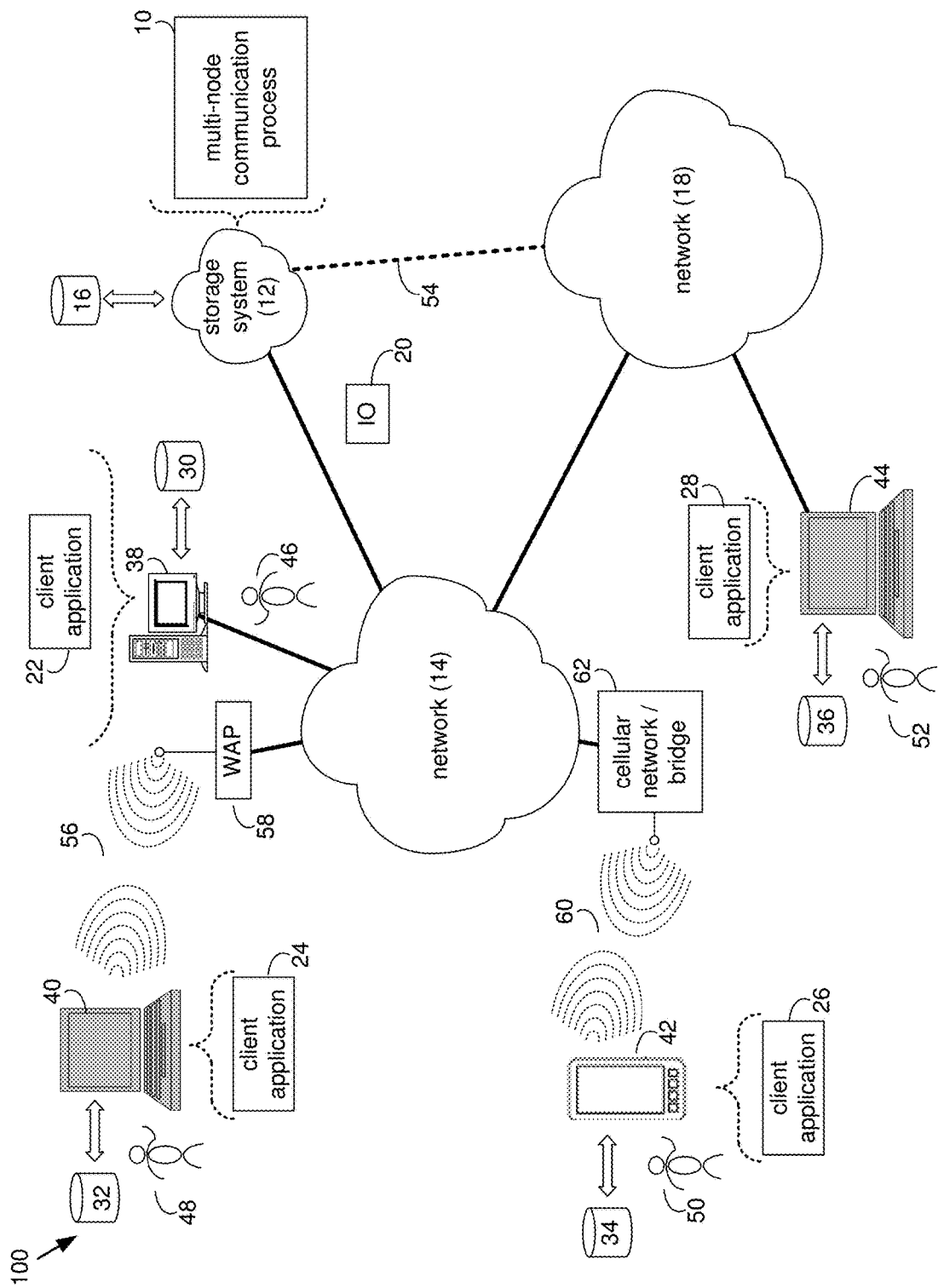
FIG. 1 is an example diagrammatic view of a storage system and a multi-node communication process coupled to a distributed computing network according to one or more example implementations of the disclosure.

System Overview:

Referring to FIG. 1, there is shown multi-node communication process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of multi-node communication process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of multi-node communication process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a multi-node communication process, such as multi-node communication process 10 of FIG. 1, may include but is not limited to, coupling a multi-host remote direct memory access (RDMA) card to at least a pair of central processing units (CPUs). One or more signals may be routed, via the multi-host RDMA card, between the at least a pair of CPUs.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
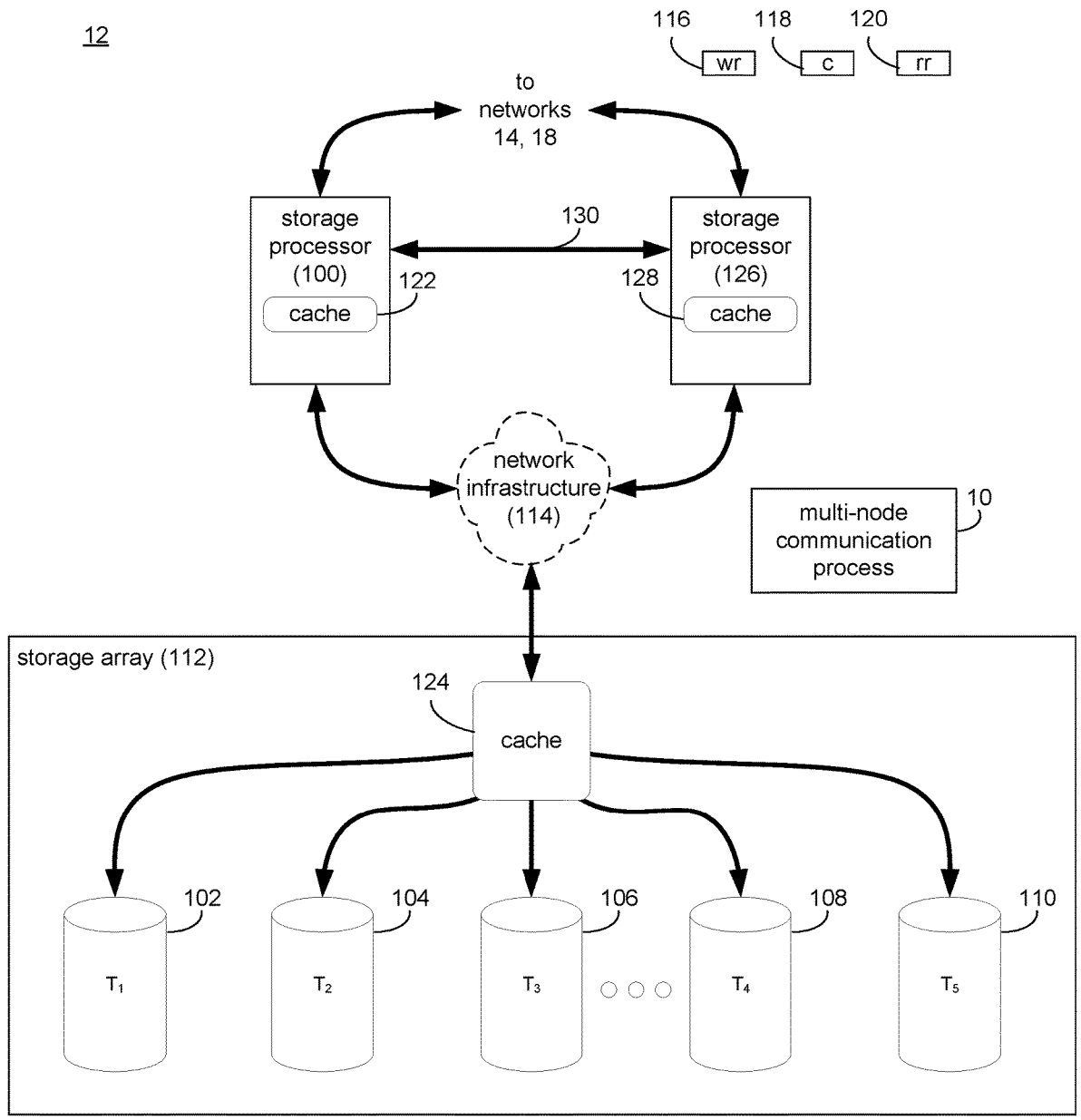
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-$n$ (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of multi-node communication process 10. The instruction sets and subroutines of multi-node communication process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of multi-node communication process 10 may be stored on storage devices (and/or executed by processors and memory architectures) that are external to storage system 12.

As discussed above, various TO requests (e.g. TO request 20) may be generated. For example, these TO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of multi-node communication process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of multi-node communication process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of multi-node communication process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of multi-node communication 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Figure 3:
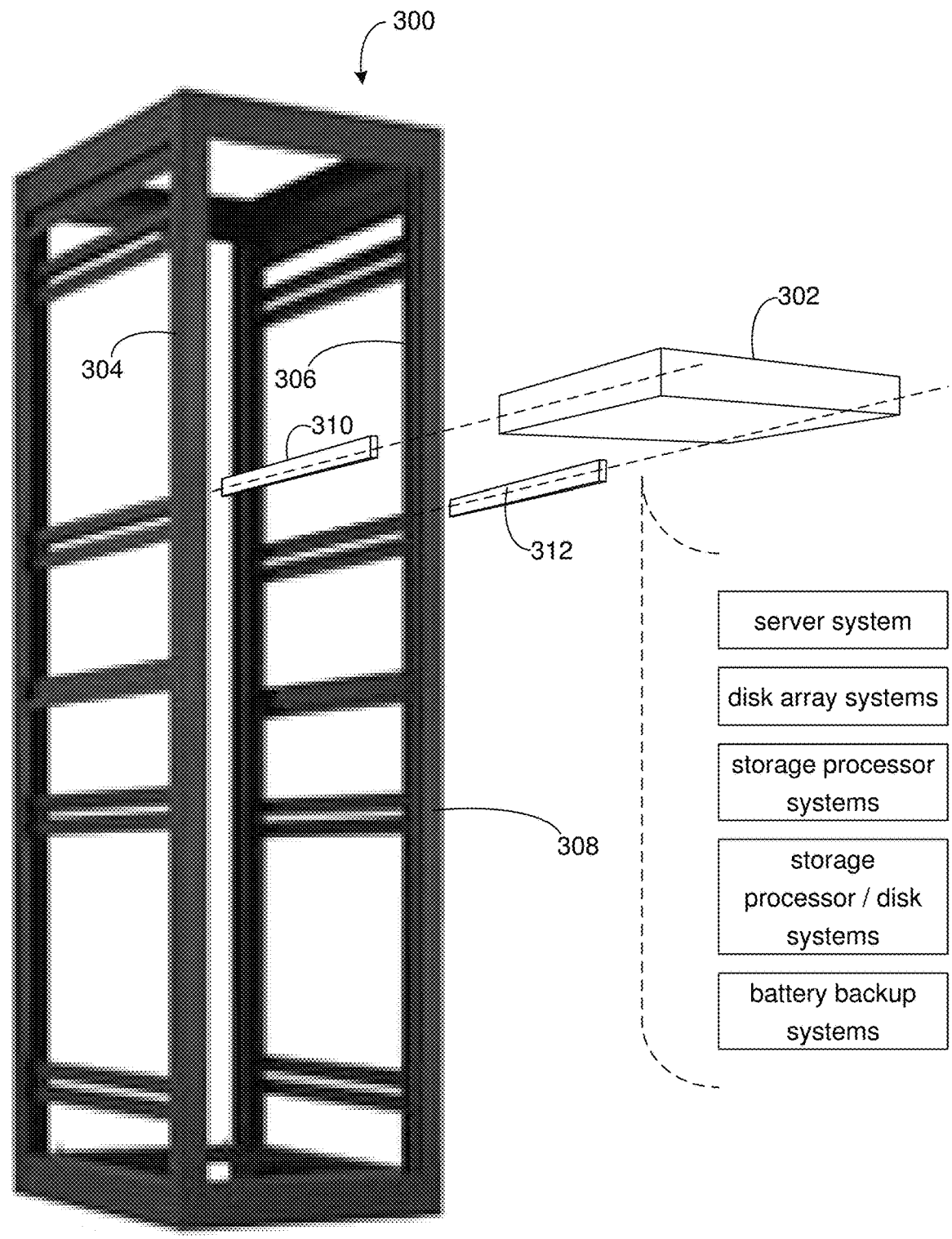
Figure 4:
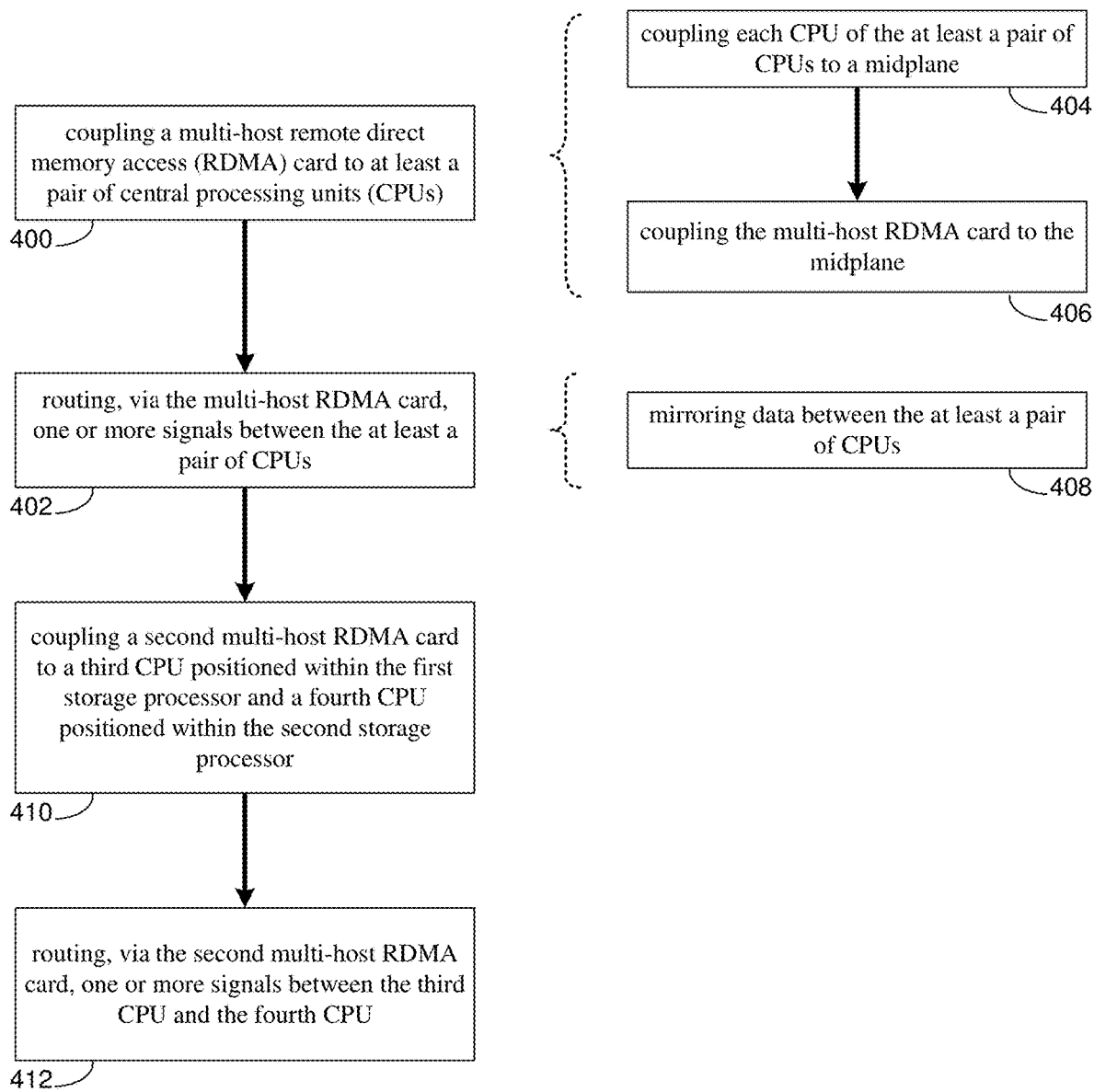
FIG. 4 is an example flowchart of the multi-node communication process of FIG. 1 according to one or more example implementations of the disclosure.

IT Rack Architecture:

Referring to FIG. 3, information technology (IT) racks (e.g., IT rack 300) may be utilized to store and organize IT components. For example, IT rack 300 may be placed within a computer room and various high-availability IT components (e.g., IT component 302) may be attached to rails (e.g., NEMA rails 304, 306) included within IT rack 300, wherein these rails (e.g., NEMA rails 304, 306) may have a standard and defined spacing between them (e.g., 19"). Typically, IT components that are configured to fit within IT rack 300 may be described as rack-mountable IT components.

Examples of the various IT components (e.g., IT component 302) mountable within IT rack 300 may include but are not limited to: server systems, disk array systems, storage processor systems (e.g., storage processor 100, storage processor 126), storage processor/disk systems, and battery backup systems.

IT rack 300 may include frame 308 (which may include one or more vertical supports, horizontal supports, and cross braces) to which NEMA rails 304, 306 may be attached. NEMA rails 304, 306 may include a plurality of evenly spaced holes that may be configured for mounting the various IT components within IT rack 300. By standardizing the spacing between NEMA rails 304, 306, the various IT devices that fit within a first IT rack may also fit within a second IT rack.

These various IT components (e.g., IT component 302) may be available in standardized heights based upon the number of rack units (U's). Examples of such standardized heights may include but are not limited to 1U IT components, 2U IT components, 3U IT components, and 4U IT components, wherein a 1U IT component is half as high as a 2U IT component, which is half as high as a 4U IT component.

IT racks (e.g., IT rack 300) may be available in various heights, which are capable of accommodating a defined number of rack units (U's). However, while the number of rack units available within a particular IT rack may be rigidly defined by the height of the IT rack, the number of IT components mountable within that IT rack may vary depending upon the height in rack units (U's) of the particular IT components being mounted within that IT rack. Therefore, by reducing the number of rack units utilized by a particular IT component within an IT rack, additional IT components may be mounted within the IT rack.

In some implementations, storage processor 100 and storage processor 126 may be positioned within IT component 302. In some implementations, a front side of IT component 302 may be generally configured for coupling to various storage components or drives (e.g., storage targets 102, 104, 106, 108, 110) and other inner-storage system components while a rear side of IT component 302 may generally be configured for coupling to various IO interfaces or components (e.g., external IO connections).

The Multi-Node Communication Process:

Referring also to FIGS. 4-10B and in some implementations, multi-node communication process 10 may couple 400 a multi-host remote direct memory access (RDMA) card to at least a pair of central processing units (CPUs). One or more signals may be routed 402, via the multi-host RDMA card, between the at least a pair of CPUs.

Figure 5:
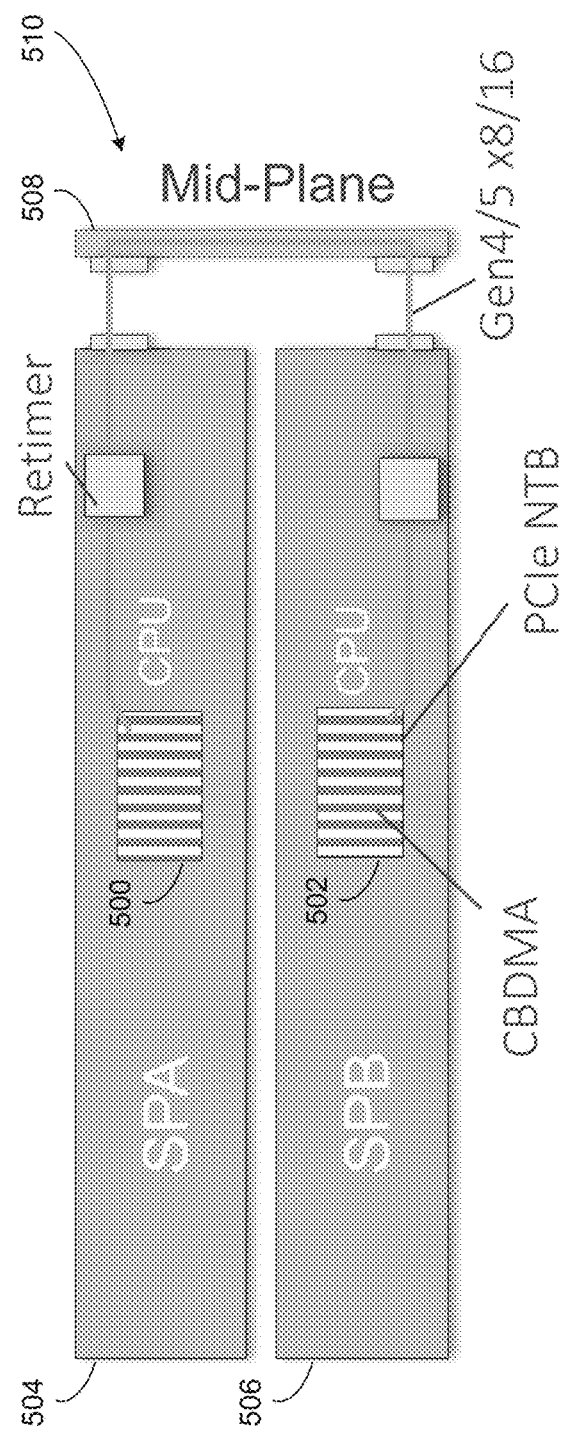
FIGS. 5-6 are example diagrammatic views of conventional approaches to connecting storage processors.

In some implementations, multi-node communication process 10 may allow for high speed data communications between multiple CPUs with a single multi-host RDMA card coupled to each CPU. Referring also to FIG. 5, conventional approaches to coupling storage processors (e.g., CPUs 500, 502 of storage processors 504, 506) includes coupling each CPU using a midplane (e.g., midplane 508) positioned on the external device/IO side (e.g., rear side 510) of an IT component (e.g., IT component 302). In this example, the coupling of CPUs 500, 502 via midplane 508 may utilize peripheral component interconnect express (PCIe) non-transparent bridge (NTB) to effectuate signaling between CPUs 500, 502. However, there is not NTB compliance between CPU vendors and/or CPU generations. For example, two different CPUs (e.g., different CPU generations from the same vendor and/or different vendors) may not communicate effectively using NTB. Further, this approach is unable to provide support for virtualized systems and virtual machines (e.g., using VMware® ESXi or similar). In addition, the conventional approach of FIG. 5 requires high software overhead to create reliable messaging above NTB. For example, to replicate RDMA paths over PCIe, software stacks may be required to mimic an Ethernet port across PCIe. Further, many storage systems utilize RDMA paths for messaging between CPUs which would require an additional low bandwidth RDMA path over NTB to be deployed. As such, the conventional approach of FIG. 5 for routing signals between CPUs may be problematic when attempting to mirror data between CPUs.

Figure 6:
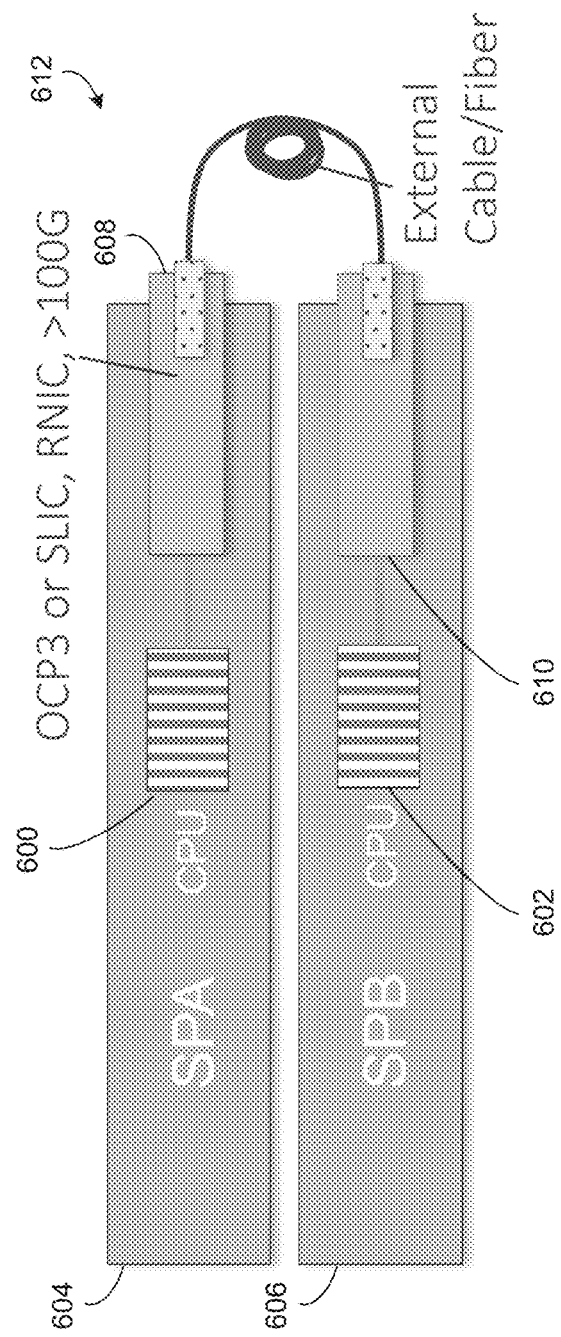

Other conventional approaches include the use of an IO card on each storage processor and a physical, external cable between the IO cards. Referring also to FIG. 6, CPUs 600, 602 of storage processors 604, 606 may be coupled to IO cards 608, 610 (e.g., one IO card coupled to each storage processor) with external, physical cabling running between IO cards 608, 610. In this example, at least two IO slots may be blocked from the rear side (e.g., rear side 612) of the IT component (e.g., IT component 302) with storage processors 604, 606. Additionally, this approach requires two IO cards to route signals between CPUs 600, 602.

As will be discussed in greater detail below, implementations of the present disclosure may allow a pair of CPUs across storage processors to be coupled with high speed connectivity using a single multi-host RDMA card. For example, multi-node communication process 10 may allow for CPUs across a pair of storage processors to communicate utilizing PCIe over Ethernet connectivity (e.g., greater than 100 gigabytes per second (>100 Gbps)). However, it will be appreciated that other network types (e.g., a fiber channel network, an InfiniBand network, or any other circuit switched/packet switched network) may be used within the scope of the present disclosure.

Figure 7:
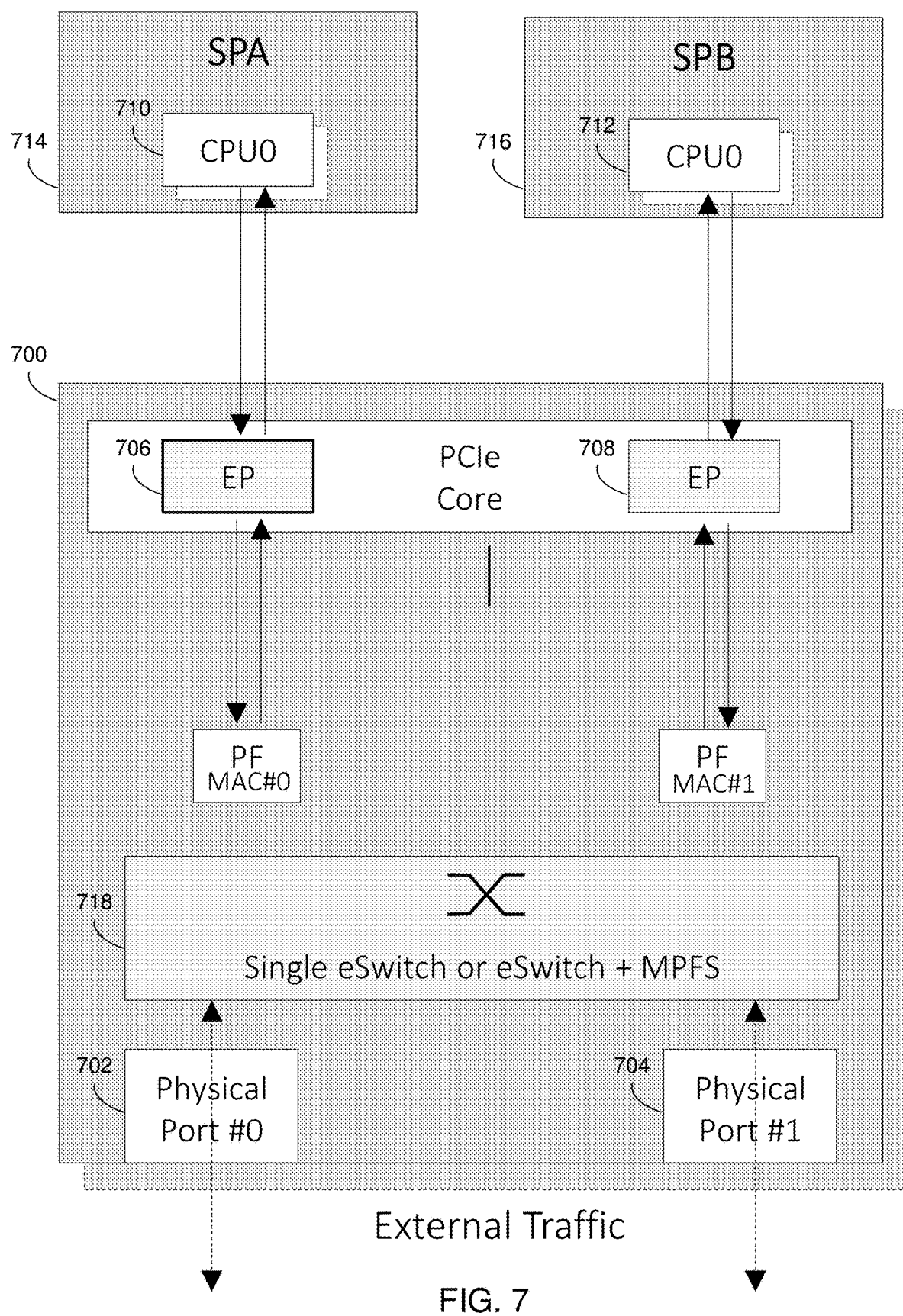
FIGS. 7-10B are example diagrammatic views of multiple storage processors being coupled via one or more multi-host remote direct memory access (RDMA) cards according to one or more example implementations of the disclosure.

In some implementations, multi-node communication process 10 may couple 400 a multi-host remote direct memory access (RDMA) card to at least a pair of central processing units (CPUs). As is known in the art, remote direct memory access allows a controller (e.g., of a network interface card (NIC)) to directly access memory without CPU intervention by by-passing the CPU. Referring also to FIG. 7 and in some implementations, a multi-host RDMA card (e.g., multi-host RDMA card 700) may include one or more physical ports (e.g., physical ports 702, 704) configured for external connections (e.g., via Ethernet or similar connection types) and may include one or more ports (e.g., ports 706, 708) for coupling (e.g., via PCIe) to one or more CPU hosts (e.g., CPU hosts 710, 712 of storage processors 714, 716). In the example of FIG. 7, a controller of multi-host RDMA card 700 may be represented as switch 718 that is configured to switch control over or access to either of ports 706 or 708 to one of CPU host 710 or 712. In this manner, multi-host RDMA card 700 may allow multiple hosts (e.g., CPU hosts 710, 712) to access the same ports (e.g., ports 702, 704) via switch 718.

In some implementations, multi-host RDMA card 700 may be configured to operate via the Open Compute Project (OCP) 3.0 specification. As is known in the art, the OCP 3.0 specification defines a form factor and various standards for network interface cards that allows for multi-host RDMA communication between CPU hosts and external ports. Implementations of the present disclosure have demonstrated that the OCP 3.0 specification allows communication between the CPU hosts by representing to a CPU host the other CPU hosts as Ethernet endpoints. In this manner, the host CPU may communicate with the other CPU hosts as Ethernet endpoints using standard RDMA communication protocols. While an example of the OCP 3.0 specification has been provided for use with multi-host RDMA cards, it will be appreciated that other specifications may allow for multi-host communication as described herein and are within the scope of the present disclosure.

As will be discussed in greater detail below, multi-node communication process 10 may allow a pair of CPUs coupled to the multi-host RDMA card to not only communicate with the one or more external ports but also with one another. Accordingly, multi-node communication process 10 may enable CPUs to maintain a high speech multi-node communication path without requiring a dedicated IO card for each CPU, external cabling between IO cards, and/or without losing support for multiple CPU vendors and virtualized systems.

Figure 8:
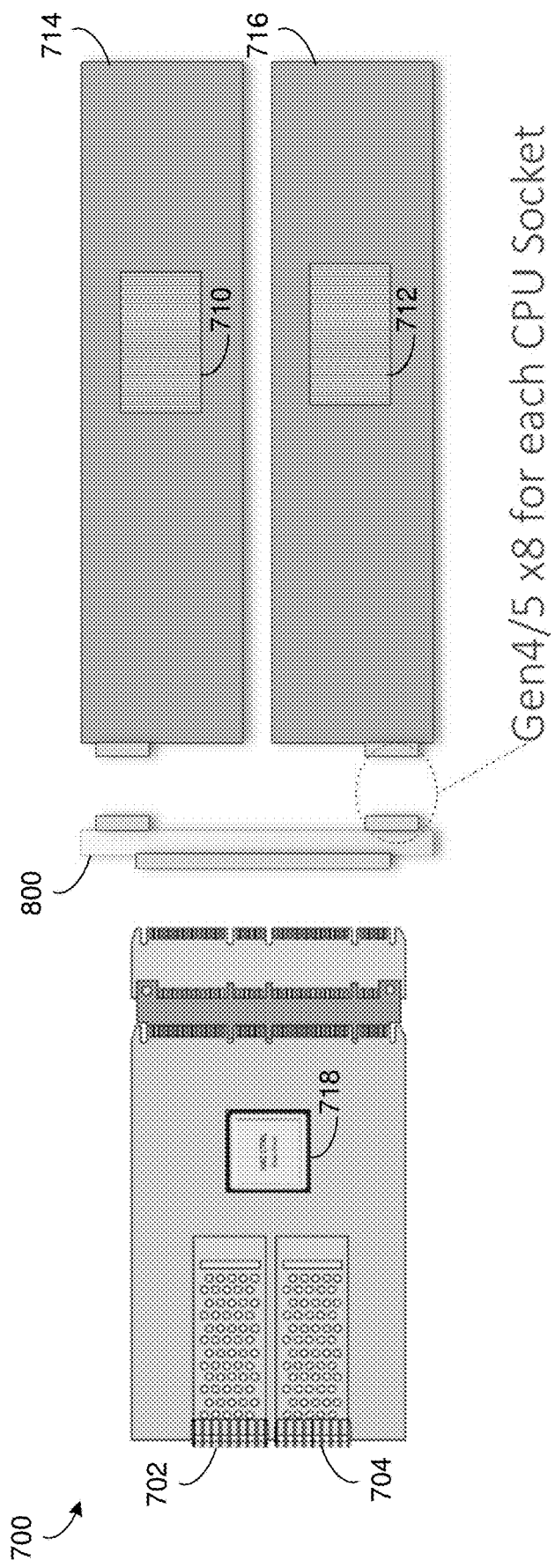

In some implementations, coupling 400 the multi-host RDMA card to the at least a pair of CPUs may include coupling 404 each CPU of the at least a pair of CPUs to a midplane and coupling 406 the multi-host RDMA card to the midplane. Referring also to FIG. 8 and in some implementations, midplane 800 may be coupled to CPU 710 and CPU 712. In some implementations, midplane 800 may provide a number of PCIe lanes to each CPU (e.g., eight lanes or "8×"). In some implementations, the number of lanes or bandwidth of midplane 800 may be allocated equally between each CPU. However, it will be appreciated that any allocation and/or number of lanes may be provided within the scope of the present disclosure. It will also be appreciated that reference to PCIe lanes is for example purposes only and that implementations of the present disclosure may include any other type of communication protocol.

In some implementations, midplane 800 may be configured to be positioned on a storage drive-side of an information technology (IT) rack. For example and as discussed above, the storage drive-side or front side of IT rack 300 may generally include various storage drives or devices that are configured to be received into IT component 302. In this manner, multi-host RDMA card 700 may be positioned on a storage drive-side of IT rack 300/IT component 302 to allow more IO connections to be utilized via IO slots on the rear side of IT component 302.

Figure 9:
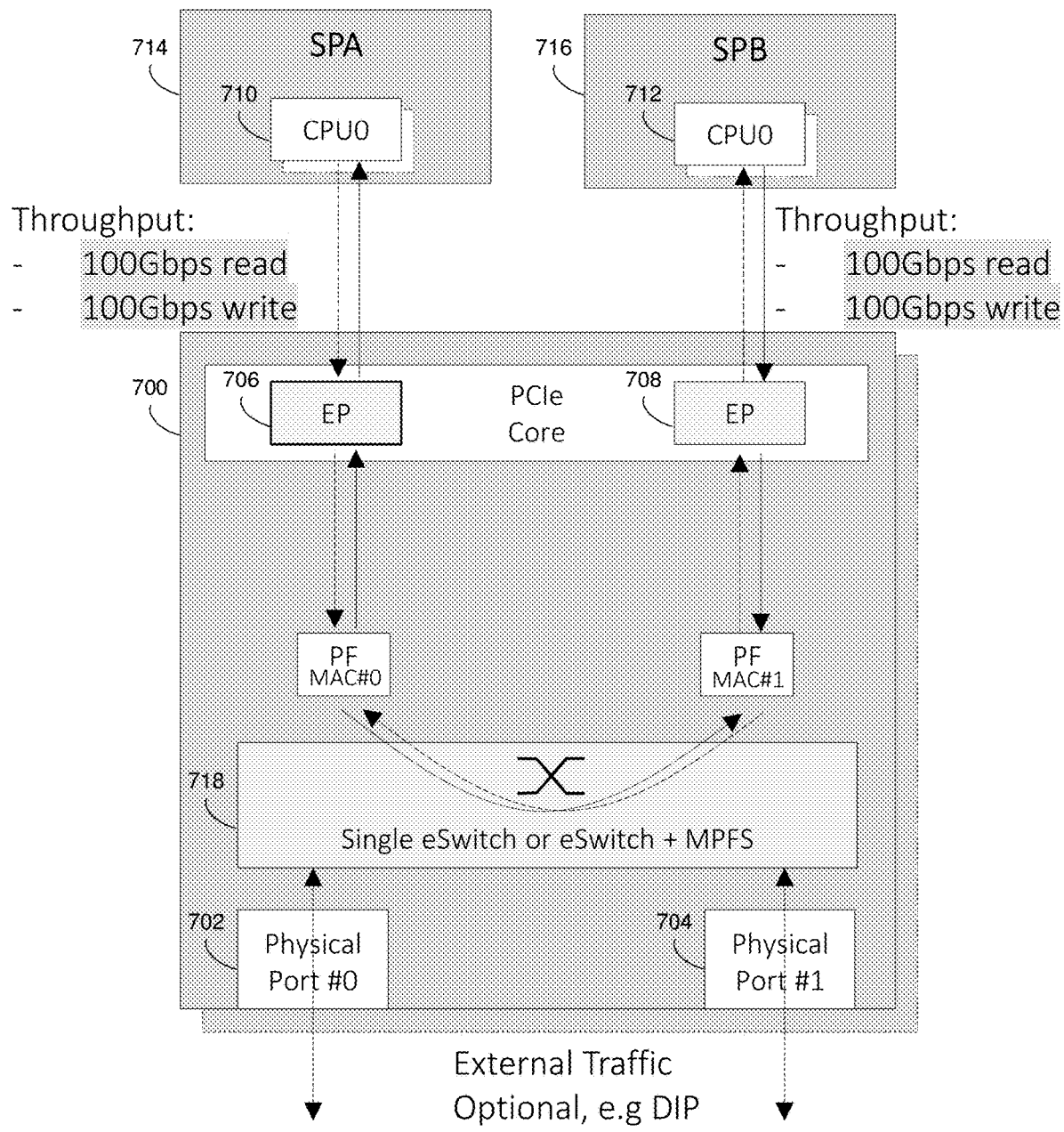

In some implementations, multi-node communication process 10 may route 402, via the multi-host RDMA card, one or more signals between the at least a pair of CPUs. Referring also to FIG. 9 and in some implementations, CPU 710 of storage processor 714 may be coupled to (e.g., via midplane 800) a host port (e.g., host port 706) of multi-host RDMA card 700 and CPU 712 of storage processor 716 may be coupled to (e.g., via midplane 800) host port 708 of multi-host RDMA card 700. In this example, when CPU 710 and CPU 712 initialize (e.g., upon boot up), multi-node communication process 10 may, via host port 706 and host port 708 of multi-host RDMA card 700, configure physical port 702 and physical port 704 for communication with each CPU. Additionally, multi-node communication process 10 may configure each CPU as an endpoint for routing 402 one or more signals between the CPUs.

For example and in some implementations, the multi-host RDMA card may be configured to provide Ethernet over PCIe connectivity between the at least a pair of CPUs. Referring again to FIG. 9 and in some implementations, multi-host RDMA card 700 may be configured to allow multiple CPUs (e.g., CPUs 710, 712) to be coupled as multiple hosts and to communicate with one another as endpoints (e.g., Ethernet endpoints accessible over RDMA). Accordingly, multi-node communication process 10 may route 402 one or more signals between CPU 710 of storage processor 714 and CPU 712 of storage processor 716 by addressing each CPU as an Ethernet endpoint for the PCIe connections between each CPU and multi-host RDMA card 700. In this manner, multi-node communication process 10 may, via multi-host RDMA card 700, provide Ethernet over PCIe connectivity between the at least a pair of CPUs (e.g., CPUs 710, 712). As shown in FIG. 9 and in some implementations, multi-node communication process 10 may provide e.g., 100 Gbps read and/or write capability for each CPU.

As discussed above and in some implementations, storage processors (e.g., CPUs of storage processors) may be coupled to a common or shared set of storage devices. Accordingly, multi-node communication process 10 may provide a connection (e.g., connection 130) between CPUs to allow the CPUs to coordinate their access to the shared storage devices. For example, multi-node communication process 10 may route 402, via the connection between CPU 710 and host port 706, host port 706 and host port 708 via switch 718, and host port 708 and CPU 712, one or more signals from CPU 710 to CPU 712 (e.g., shown as the arrow path in broken lines in FIG. 9) to communicate various operations that CPU 710 is performing on a shared set of storage devices and vice versa (e.g., shown as the arrow path in solid lines in FIG. 9). In this manner, multi-node communication process 10 may provide a high speed communication path (e.g., connection 130) between CPU 710 and CPU 712 for coordinating access to a shared set of storage devices.

In some implementations, routing 402 the one or more signals between the at least a pair of CPUs may include mirroring 408 data between the at least a pair of CPUs. For example and as discussed above, storage processor 714 and storage processor 716 may be configured in an active/active relationship where each storage processor actively runs the same kind of service(s) simultaneously. This may help achieve load balancing over the storage processors by distributing workloads across all storage processors in order to prevent any single storage processor from getting overloaded. Because there are more nodes available to serve, there may be a marked improvement in throughput and response times. An active/active relationship may also provide at least one active storage processor in the event that one of the storage processors in the active-active relationship fails. Accordingly, when processing data via either storage processor 714 or storage processor 716, multi-node communication process 10 may mirror 408 data between CPUs 710 and 712 to ensure that data provided to any storage processor is accessible by another storage processor if one storage processor fails.

Figure 10A:
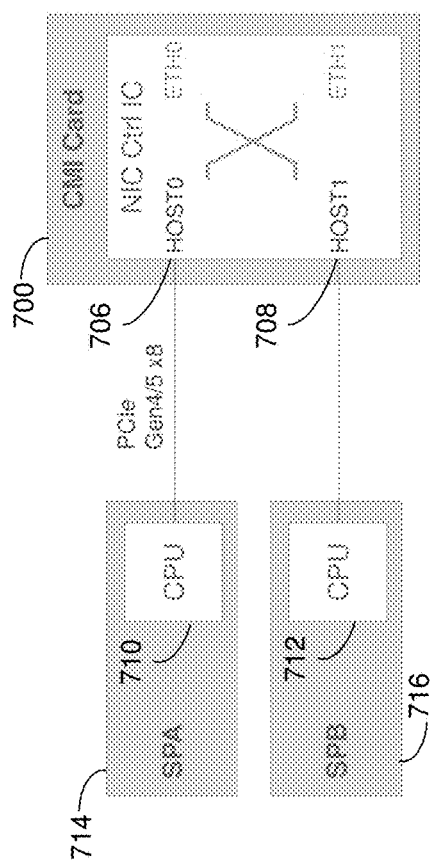

In some implementations, a first CPU of the at least a pair of CPUs may be positioned within a first storage processor and a second CPU of the at least a pair of CPUs may be positioned within a second storage processor. Referring also to FIG. 10A and in some implementations, a first storage processor (e.g., storage processor 714) may include e.g., one CPU (e.g., CPU 710) and a second storage processor (e.g., storage processor 716) may include e.g., one CPU (e.g., CPU 712). In this example, CPU 710 may be coupled 400 to a first host port (e.g., host port 706) of multi-host RDMA card 700 and may be allocated a first portion of communication bandwidth (e.g., a first portion of PCIe lanes) between multi-host RDMA card 700 and the CPUs. CPU 712 may be coupled 400 to a second host port (e.g., host port 708) of multi-host RDMA card 700 and may be allocated a second portion of communication bandwidth (e.g., a second portion of PCIe lanes) between multi-host RDMA card 700 and the CPUs. As discussed above, multi-node communication process 10 may route 402 one or more signals between CPU 710 of first storage processor 714 and CPU 712 of second storage processor 716 via the controller of multi-host RDMA card 700 and the CPUs. While the example of FIG. 10A includes a description of a number of PCIe lanes, it will be appreciated that this is for example purposes only and that any number of PCIe lanes or other communication channels may be used with various communication protocols within the scope of the present disclosure.

Figure 10B:
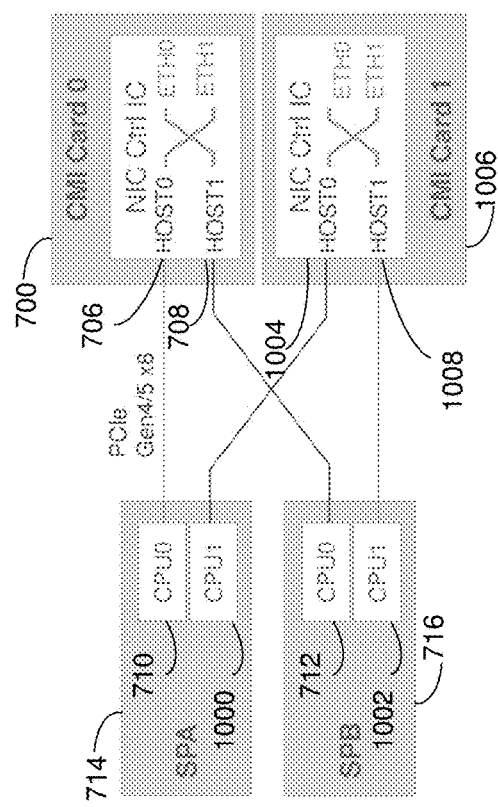

In some implementations, multi-node communication process 10 may couple 410 a second multi-host RDMA card to a third CPU positioned within the first storage processor and a fourth CPU positioned within the second storage processor. Referring also to FIG. 10B and in some implementations, first storage processor 714 may include e.g., two CPUs (e.g., CPUs 710, 1000) and second storage processor 714 may include e.g., two CPUs (e.g., CPUs 712, 1002). In this example, CPU 710 may be coupled 400 to a first host port (e.g., host port 706) of a first multi-host RDMA card (e.g., multi-host RDMA card 700) and may be allocated a first portion of communication bandwidth (e.g., a first portion of PCIe lanes) between multi-host RDMA card 700. In this example, CPU 1000 may be coupled 410 to a first host port (e.g., host port 1004) of a second multi-host RDMA card (multi-host RDMA card 1006) and may be allocated a first portion of communication bandwidth (e.g., a first portion of PCIe lanes) between multi-host RDMA card 1006 and the CPUs.

Continuing with the above example, CPU 712 may be coupled 400 to a second host port (e.g., host port 708) of multi-host RDMA card 700 and may be allocated a second portion of communication bandwidth (e.g., a second portion of PCIe lanes) between multi-host RDMA card 700 and the CPUs. CPU 1002 may be coupled 410 to a second host port (e.g., host port 1008) of multi-host RDMA card 1006 and may be allocated a second portion of communication bandwidth (e.g., a second portion of PCIe lanes) between multi-host RDMA card 1006 and the CPUs. As discussed above and in some implementations, multi-node communication process 10 may include midplane 800 and CPUs 710, 712, 1000, and/or 1002 may be coupled to midplane 800.

As discussed above and in some implementations, multi-node communication process 10 may route 402 one or more signals between CPU 710 of first storage processor 714 and CPU 712 of second storage processor 716 via the controller of multi-host RDMA card 700 and may route 412 one or more signals between CPU 1000 of first storage processor 714 and CPU 1002 of second storage processor 716 via the controller of multi-host RDMA card 1006. In this manner, multi-node communication process 10 may provide connectivity between each pair of CPUs using a separate multi-host RDMA card. However, it will be appreciated that the multi-host RDMA card may be configured to route 402 one or more signals for any number of CPUs within the scope of the present disclosure.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   coupling a single multi-host remote direct memory access (RDMA) card to at least a pair of central processing units (CPUs);
   representing to each CPU, via the single multi-host RDMA card, every other CPU of the at least a pair of CPUs as an endpoint; and
   routing, via the single multi-host RDMA card, one or more signals between the at least a pair of CPUs.

2. The computer-implemented method of claim 1, wherein coupling the single multi-host RDMA card to the at least a pair of CPUs includes:
   coupling each CPU of the at least a pair of CPUs to a midplane; and
   coupling the single multi-host RDMA card to the midplane.

3. The computer-implemented method of claim 2, wherein the midplane is configured to be positioned on a storage drive-side of an information technology (IT) rack.

4. The computer-implemented method of claim 1, wherein a first CPU of the at least a pair of CPUs is positioned within a first storage processor and a second CPU of the at least a pair of CPUs is positioned within a second storage processor.

5. The computer-implemented method of claim 4, further comprising:
   coupling a second multi-host RDMA card to a third CPU positioned within the first storage processor and a fourth CPU positioned within the second storage processor; and
   routing, via the second multi-host RDMA card, one or more signals between the third CPU and the fourth CPU.

6. The computer-implemented method of claim 1, wherein the single multi-host RDMA card is configured to provide Ethernet over PCIe connectivity between the at least a pair of CPUs.

7. The computer-implemented method of claim 1, wherein routing the one or more signals between the at least a pair of CPUs includes mirroring data between the at least a pair of CPUs.

8. A computer program product residing on a non-transitory computer readable medium having a plurality of instructions stored thereon which, when executed by a processor, cause the processor to perform operations comprising:
   coupling a single multi-host remote direct memory access (RDMA) card to at least a pair of central processing units (CPUs);
   representing to each CPU, via the single multi-host RDMA card, every other CPU of the at least a pair of CPUs as an endpoint; and
   routing, via the single multi-host RDMA card, one or more signals between the at least a pair of CPUs.

9. The computer program product of claim 8, wherein coupling the single multi-host RDMA card to the at least a pair of CPUs includes:
   coupling each CPU of the at least a pair of CPUs to a midplane; and
   coupling the single multi-host RDMA card to the midplane.

10. The computer program product of claim 9, wherein the midplane is configured to be positioned on a storage drive-side of an information technology (IT) rack.

11. The computer program product of claim 8, wherein a first CPU of the at least a pair of CPUs is positioned within a first storage processor and a second CPU of the at least a pair of CPUs is positioned within a second storage processor.

12. The computer program product of claim 11, the operations further comprising:
   coupling a second multi-host RDMA card to a third CPU positioned within the first storage processor and a fourth CPU positioned within the second storage processor; and
   routing, via the second multi-host RDMA card, one or more signals between the third CPU and the fourth CPU.

13. The computer program product of claim 8, wherein the single multi-host RDMA card is configured to provide Ethernet over PCIe connectivity between the at least a pair of CPUs.

14. The computer program product of claim 8, wherein routing the one or more signals between the at least a pair of CPUs includes mirroring data between the at least a pair of CPUs.

15. A computing system comprising:
a memory; and
a processor configured to couple a single multi-host remote direct memory access (RDMA) card to at least a pair of central processing units (CPUs), wherein the processor is further configured to represent to each CPU, via the single multi-host RDMA card, every other CPU of the at least a pair of CPUs as an endpoint; and wherein the processor is further configured to route, via the single multi-host RDMA card, one or more signals between the at least a pair of CPUs.

16. The computing system of claim 15, wherein coupling the single multi-host RDMA card to the at least a pair of CPUs includes:
coupling each CPU of the at least a pair of CPUs to a midplane; and
coupling the single multi-host RDMA card to the midplane.

17. The computing system of claim 15, wherein the midplane is configured to be positioned on a storage drive-side of an information technology (IT) rack.

18. The computing system of claim 15, wherein a first CPU of the at least a pair of CPUs is positioned within a first storage processor and a second CPU of the at least a pair of CPUs is positioned within a second storage processor.

19. The computing system of claim 18, wherein the processor is further configured to:
couple a second multi-host RDMA card to a third CPU positioned within the first storage processor and a fourth CPU positioned within the second storage processor; and
route, via the second multi-host RDMA card, one or more signals between the third CPU and the fourth CPU.

20. The computing system of claim 15, wherein the single multi-host RDMA card is configured to provide Ethernet over PCIe connectivity between the at least a pair of CPUs.

\* \* \* \* \*